United States Patent
Watanabe et al.

(10) Patent No.: US 7,409,859 B2
(45) Date of Patent: Aug. 12, 2008

(54) THERMAL TYPE FLOW MEASURING APPARATUS

(75) Inventors: Izumi Watanabe, Hitachinaka (JP); Junichi Horie, Hitachinaka (JP); Keiichi Nakada, Munich (DE)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/480,979

(22) Filed: Jul. 6, 2006

(65) Prior Publication Data
US 2007/0024119 A1    Feb. 1, 2007

(30) Foreign Application Priority Data
Jul. 8, 2005    (JP) .............................. 2005-200747

(51) Int. Cl.
*G01F 1/68* (2006.01)
(52) U.S. Cl. .................................. 73/204.26
(58) Field of Classification Search .............. 73/204.26, 73/204.24, 204.25
See application file for complete search history.

(56) References Cited

U.S. PATENT DOCUMENTS 5,708,205 A * 1/1998 Yamada et al. ........... 73/204.26

FOREIGN PATENT DOCUMENTS

JP    6-63801    8/1994

* cited by examiner

*Primary Examiner*—Jewel V Thompson
(74) *Attorney, Agent, or Firm*—Mattingly, Stanger, Malur & Brundidge, PC

(57) ABSTRACT

A thermal type flow measuring apparatus includes a heating resistor provided in a thin part of a substrate and a bridge circuit for driving the heating resistor to have a preset heating temperature, wherein resistor elements on sides forming the bridge circuit are temperature sensitive resistors, a part or whole of at least one of the temperature sensitive resistors is placed in the thin part and near the heating resistor so that the temperature sensitive resistor is influenced by a heat of the heating resistor, and the preset heating temperature is increased as the flow of fluid is increased. This configuration introduces flow dependency into the heating temperature of the heating resistor.

16 Claims, 7 Drawing Sheets

THERMAL TYPE FLOW MEASURING APPARATUS

BACKGROUND OF THE INVENTION

The present invention relates to a thermal type flow measuring apparatus for measuring the flow of fluid, and more particularly to a heat-resistant thermal type flow measuring apparatus used for the air flow sensor of an internal combustion engine or the air flow sensor of a fuel cell system.

Conventionally, a thermal type air flow sensor, capable of directly sensing the mass air flow, has been widely used as an air flow sensor in the intake air path of an internal combustion engine, for example, in a car, for measuring the intake air flow. Recently, an air flow sensor, manufactured based on the semiconductor micro-machining technology, has attracted special attention because it has fast response that allows even a backflow to be sensed.

One of known thermal-type air flow sensors is a sensor that heat controls a thermal resistor to measure the air flow based on the heat radiation amount of the heating resistor. Another known thermal-type air flow sensor is a heat-resistant thermal type air flow meter that heat controls a heating resistor to measure the air flow according to a change in the temperature of a temperature-sensing resistor placed near the heating resistor.

The problem with air flow detection by means of this heating resistor is that the resistance value of the heating resistor deteriorates with age and the change in the resistance value changes the sensitivity characteristics that, in turn, changes the air flow signal value.

A method is proposed in JP-B-6-63801 to solve this problem. According to the proposed method, a correction circuit is provided to correct a change in the air flow characteristics, caused by a change in the resistance value of the heating resistor, to prevent the output air flow value from being affected by a change in the characteristics of the heater resistor.

SUMMARY OF THE INVENTION

However, the technology disclosed in JP-B-6-63801 requires an additional correction circuit, making both the circuit configuration and the sensor structure complex.

In general, to prevent aging deterioration in a heating resistor, the heating temperature of the heating resistor should be lowered. However, because the sensitivity of the sensor is decreased in proportion to a drop in temperature when the heating temperature is lowered, even a slight aging deterioration in the heating resistor could greatly change the output characteristics. Therefore, a change in the air flow characteristics caused by aging deterioration in the heating resistor cannot be suppressed.

In addition, the most severe temperature environmental condition occurs in an actual car when the temperature of the intake air is increased by the radiation heat of the engine and, because the air flow is low, the temperature of the heating resistor is increased, for example, when the car is idling after high-load driving such as high-speed driving or hill-climbing driving. There is a need for a thermal type air flow meter that does not deteriorate with age under the most rigid environmental condition described above.

It is an object of the present invention to provide a thermal type air flow meter that can reduce the soiling of a heating resistor and, at the same time, reduce a measurement error caused by aging deterioration even under a severe environmental condition, such as an idling driving state after high-load driving, without complicating the structure of the circuit and the sensor.

A thermal type flow measuring apparatus according to the present invention comprises a heating resistor provided in a thin part of a substrate and a bridge circuit for driving the heating resistor to have a preset heating temperature, wherein resistor elements on the sides forming the bridge circuit are temperature sensitive resistors, a part or whole of at least one of the temperature sensitive resistors is placed in the thin part and near the heating resistor so that the temperature sensitive resistor is influenced by a heat of the heating resistor, and the preset heating temperature is increased as the flow of fluid is increased. This configuration introduces flow dependency into the heating temperature of the heating resistor.

According to the present invention, it is possible to keep the heating temperature of the heating resistor low in the idling driving state, to increase the heating temperature as the air flow becomes higher, to reduce the soiling of the heating resistor, and to reduce a change in the output characteristics caused by aging deterioration without complicating the structure of circuits and sensors.

Other objects, features and advantages of the invention will become apparent from the following description of the embodiments of the invention taken in conjunction with the accompanying drawings.

DESCRIPTION OF THE EMBODIMENTS

Embodiments of the present invention will be described below with reference to the drawings.

A first embodiment of the present invention will be described with reference to FIG. 1 to FIG. 7.

Figure 1:
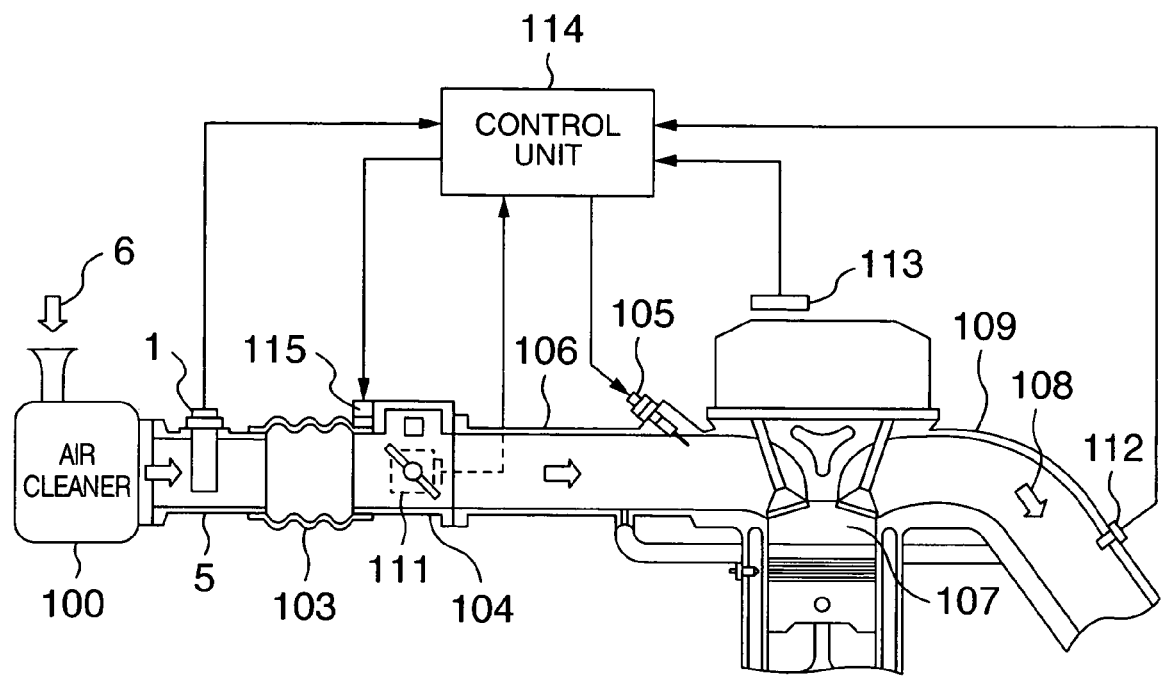
FIG. 1 is a diagram showing the general configuration of an embodiment of the operation control system of an internal combustion engine, especially, a gasoline engine, to which a thermal type air flow meter of the present invention is applied.

FIG. 1 is a diagram showing the general configuration of the main part of the operation control system of an internal combustion engine to which a thermal type air flow meter 1 in the first embodiment of the present invention is applied.

Referring to FIG. 1, intake air 6 taken in by an air cleaner 100 is supplied to an engine cylinder 107 via an intake manifold 106 comprising a main pipe 5 in which the thermal type air flow meter 1 is provided, an intake duct 103, a throttle body 104, and an injector (fuel injection valve) 105 to which fuel is supplied. Exhaust gas 108 produced by the engine cylinder 107 is exhausted externally via an exhaust manifold 109.

The thermal type air flow meter 1 is provided between the air cleaner 100 and the throttle body 104 in the engine room. An air flow signal output from the thermal type air flow meter 1, an intake air temperature signal, a throttle valve angle signal output from a throttle angle sensor 111, an oxygen concentration signal output from an O2 sensor 112 provided in the exhaust manifold 109, and an engine speed signal output from an engine speedometer 113 are sent to a control unit 114.

The control unit 114 serially calculates the received signals to find the optimum fuel injection amount and the appropriate idle air control valve opening and, using the resulting values, controls the injector 105 and an idle air control valve 115.

Figure 2:
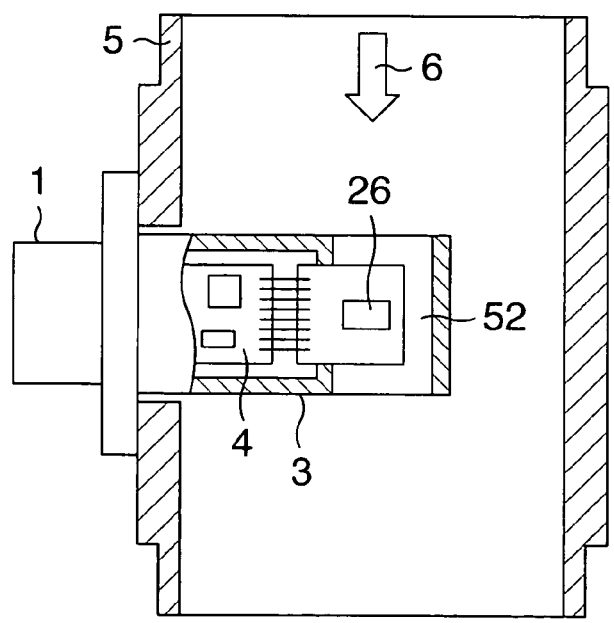
FIG. 2 is a diagram showing the general configuration of a thermal type air flow meter of the present invention.

FIG. 2 is a diagram showing the general configuration of the thermal type air flow meter 1 in the first embodiment of the present invention.

Referring to FIG. 2, the thermal type air flow meter 1 comprises a housing 3, a circuit board 4 installed in the housing 3, a sub path 52 connected to the end of the housing 3 and provided in the cylindrical main pipe 5, and a thermal type air flow sensor element 26 installed in the sub path 52. The sub path 52 is square, spiral, or so on in shape.

Figure 3:
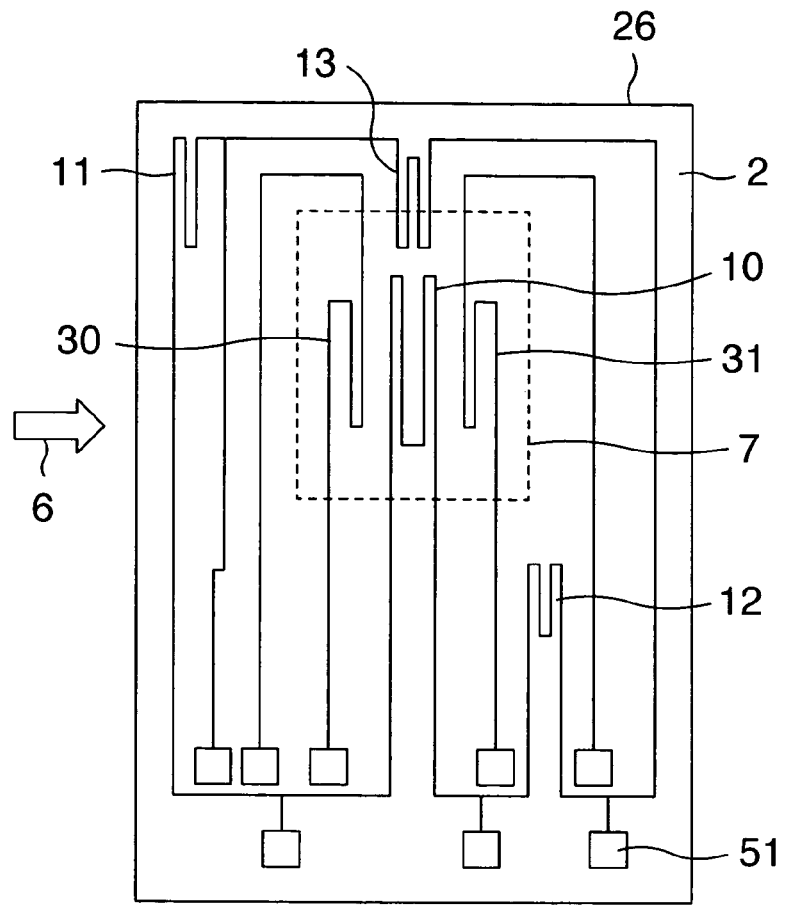
FIG. 3 is a diagram showing the wiring pattern of a thermal type air flow sensor element of a thermal type air flow meter in a first embodiment of the present invention.

FIG. 3 is a diagram showing the wiring pattern of the thermal type air flow sensor element 26 in the thermal type air flow meter 1 in the first embodiment of the present invention.

Referring to FIG. 3, the thermal type air flow sensor element 26 comprises a semiconductor substrate 2, a thin part 7 formed approximately in the center of the semiconductor substrate 2, a heating resistor 10, temperature sensitive resistors 11, 12, and 13 made of the same material as that of the heating resistor 10, an upstream temperature sensor 30, and a downstream temperature sensor 31. The resistors are connected to an electrode 51, made of aluminum and so on, for electrical connection to an external device. Note that the arrow in FIG. 3 indicates the direction of fluid 6.

The semiconductor substrate 2, made of a material such as silicon, is about 2.5 mm×6 mm×0.5 mm in size. The thin part 7 formed on the semiconductor substrate 2 is about 0.5 mm×1 mm with the thickness of about 0.002 mm.

The temperature sensitive resistors 11, 12, and 13 should preferably be formed at the same time by the same process. Doing so allows the temperature sensitive resistors 11, 12, and 13 to have an equal resistance temperature coefficient that reduces variations in the flow characteristics and the fluid characteristics. Similarly, the upstream temperature sensor 30 and the downstream temperature sensor 31 should preferably be formed at the same time by the same process as that of the temperature sensitive resistors 11, 12, and 13 to reduce the cost.

More specifically, the material used for the temperature sensitive resistors 11, 12, and 13 are polysilicon resistors, resistors created by doping impurities in monocrystal silicon, platinum, nickel, tungsten, or titanium.

The thin part 7 of the semiconductor substrate 2, formed in the dotted part in FIG. 3, includes the heating resistor 10, the upstream temperature sensor 30, the downstream temperature sensor 31, and a part of the temperature sensitive resistor 13.

The upstream temperature sensor 30 is provided in the upstream side of the heating resistor 10, while the downstream temperature sensor 31 is provided in the downstream side of the heating resistor 10. The temperature sensitive resistor 13, which is a resistor provided in a position diagonal to the heating resistor 10 in a bridge circuit in FIG. 4 that will be shown later, is placed in a position subject to the influence of the heat of the heating resistor 10.

Figure 4:
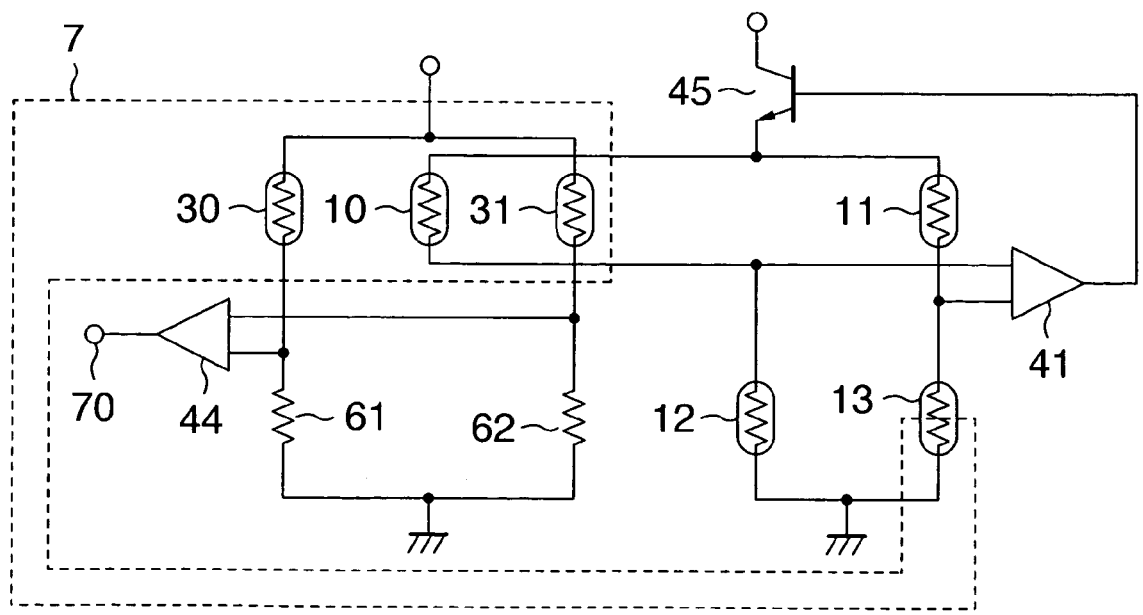
FIG. 4 is a circuit diagram including the thermal type air flow sensor element of the thermal type air flow meter in the first embodiment of the present invention.

FIG. 4 is a diagram showing a circuit including the thermal type air flow sensor element 26 shown in FIG. 3.

Referring to FIG. 4, the circuit including the thermal type air flow sensor element 26 comprises the heating resistor 10, the temperature sensitive resistors 11, 12, and 13, differential amplifiers 41 and 44, a transistor 45, the upstream temperature sensor 30, the downstream temperature sensor 31, and fixed resistors 61 and 62.

The heating resistor 10 and the temperature sensitive resistors 11, 12, and 13 configure a bridge circuit, in which the heating resistor 10 and the temperature sensitive resistor 12 are connected in series and the temperature sensitive resistors 11 and 13 are connected in series. The series-connected heating resistor 10 and the temperature sensitive resistor 12 are connected in parallel to the series-connected temperature sensitive resistors 11 and 13. The connection point between the heating resistor 10 and the temperature sensitive resistor 11 is connected to the emitter of the transistor 45. The connection point between the heating resistor 10 and the temperature sensitive resistor 12 is connected to one of the input terminals of the differential amplifier 41, and the connection point between the temperature sensitive resistors 11 and 13 is connected to the other input terminal of the differential amplifier 41. The output terminal of the differential amplifier 41 is connected to the base of the transistor 45.

The heating temperature of the heating resistor 10 is determined based on the resistance values of the temperature sensitive resistors 11, 12, and 13 and is heat-controlled to an approximately constant temperature difference of $\Delta T$ in relation to the ambient temperature through the feedback control of the differential amplifier 41 and the transistor 45.

More specifically, if the $\Delta T$ of the heating resistor 10 is controlled to 100° C., the heating resistor 10 is heat controlled to about 120° C. when the ambient temperature is 20° C., and the heating resistor 10 is heat controlled to about 200° C. when the ambient temperature is 100° C.

The upstream and downstream temperature sensors 30 and 31, provided in the upstream and downstream of the heating resistor 10, and the fixed resistors 61 and 62 constitute a temperature sensor bridge circuit in which the upstream temperature sensor 30 and the fixed resistor 61 are connected in series and the downstream temperature sensor 31 and the fixed resistor 62 are connected in series. The series-connected temperature sensor 30 and the resistor 61 are connected in parallel to the series-connected temperature sensor 31 and the resistor 62. The connection point between the temperature sensor 30 and the resistor 61 is connected to one of the input terminals of the differential amplifier 44, and the connection point between the temperature sensor 31 and the resistor 62 is connected to the other input terminal of the differential amplifier 44. The output of the differential amplifier 44 is supplied to a terminal 70. That is, the potential difference corresponding to the temperature difference between the upstream and downstream temperature sensors 30 and 31 is amplified by the differential amplifier 44 and is supplied to the output terminal 70 of the thermal type air flow meter 1.

Note that the dotted line in FIG. 4 indicates the thin part 7 and, in the thin part 7, the heating resistor 10, a part of the temperature sensitive resistor 13 positioned in the diagonal position in the bridge circuit, and the upstream and downstream temperature sensors 30 and 31 are provided.

As shown in FIG. 3 and FIG. 4, a part of the temperature sensitive resistor 13, positioned diagonally with respect to the heating resistor 10 in the bridge circuit, is placed in the thin part 7 so that the part is influenced by the heat of the heating resistor 10. This structure makes the heating temperature of the heating resistor 10 dependent on the air flow.

That is, if there is no wind or a slight wind, the heat of the heating resistor 10 is transmitted to the temperature sensitive resistor 13 via the thin part 7 to heat the temperature sensitive resistor 13. As the temperature sensitive resistor 13 is heated, the balance of the bridge circuit is changed and the heating temperature of the heating resistor 10 is lowered.

On the other hand, if the air flow is high, the heat generated by the heating resistor 10 is not transmitted easily to the temperature sensitive resistor 13 and, as a result, the heating temperature of the heating resistor 10 rises. The following describes this mechanism with reference to the drawings.

Figure 5:
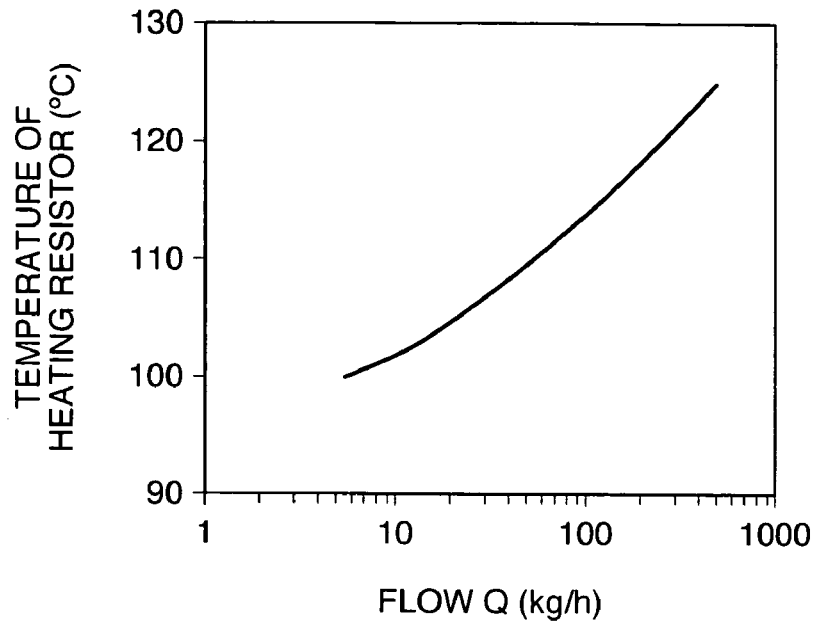
FIG. 5 is a diagram showing a change in the heating temperature with respect to the air flow of a heating resistor in the first embodiment of the present invention.

FIG. 5 is a diagram showing a change in the heating temperature with respect to the air flow of the heating resistor 10.

In FIG. 5, the horizontal axis indicates the air flow Q(kg/h) and the vertical axis indicates the temperature (° C.) of the heating resistor 10. As shown in FIG. 5, the heating temperature of the heating resistor 10 is heat controlled to about 100° C. in a low air flow area while the heating temperature is heat controlled to 125° C. in a high air flow area. As described above, air flow dependency, if introduced into the heating temperature of the heating resistor 10, improves the sensitivity in the high air flow area. The following describes this condition more in detail.

Figure 6:
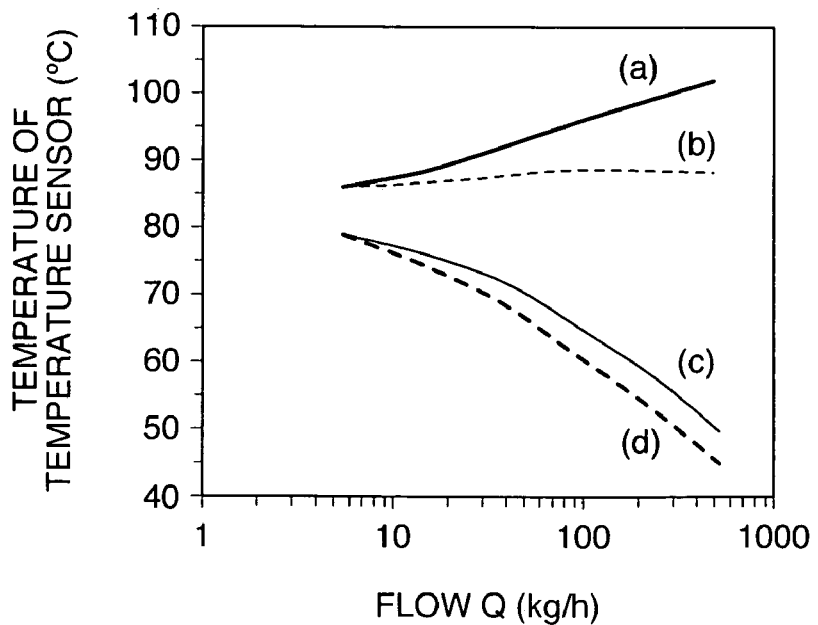
FIG. 6 is a diagram showing a comparison between a temperature change in the air flows of an upstream temperature sensor and a downstream temperature sensor in the first embodiment of the present invention and a temperature change in the air flows of the temperature sensors in the prior art.

FIG. 6 is a figure showing a comparison between the prior art technology and the present invention in the temperature change in the upstream temperature sensor 30 and the downstream temperature sensor 31.

Referring to FIG. 6, (a) indicates the temperature change with respect to the air flow of the upstream temperature sensor 30, and (c) indicates the temperature change with respect to the air flow of the downstream temperature sensor 31, according to the present invention. (b) indicates the temperature change with respect to the air flow of the upstream temperature sensor, and (d) indicates the temperature change with respect to the air flow of the downstream temperature sensor, in the prior art.

Comparison between (a) and (b) indicates that there is air flow dependency in the heating temperature of the upstream temperature sensor 30 of the present invention. In addition, the signal of the output terminal 70 of the thermal type air flow meter 1 becomes stronger as the temperature difference between the upstream temperature sensor 30 and the downstream temperature sensor 31 becomes larger. Therefore, as compared with the prior art, the sensitivity in a high air flow area is improved in the present invention.

Figure 7:
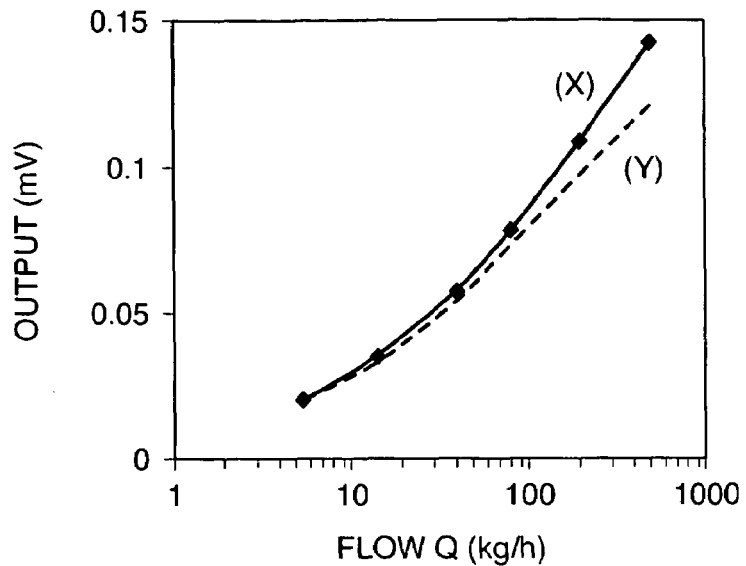
FIG. 7 is a diagram showing a comparison between the output characteristics of the thermal type air flow meter in the first embodiment of the present invention and the output characteristics in the prior art.

FIG. 7 is a diagram showing the comparison between the first embodiment of the present invention and the prior art in the output characteristics of the thermal type air flow meter 1.

In FIG. 7, curve (X) indicates the output characteristics of the thermal type air flow meter 1 of the present invention, and curve (Y) indicates the output characteristics in the prior art.

Comparison between curve (X) and curve (Y) indicates that, though there is not a significant difference between the prior art and the present invention in the low air flow area, the output of the present invention becomes larger in the high air flow area. Thus, the comparison shows the application of the present invention will improve the sensitivity in the high air flow.

In addition, when applied to the detection of the intake air of an internal combustion engine, the present invention is especially effective when the heating resistor 10 deteriorates with age due to heat or when accuracy is decreased or soiling occurs due to water droplets in wet weather.

The most severe temperature environmental condition in an actual car occurs when the intake air temperature is increased by the radiation heat of an engine, for example, when the car is idling after high-load driving such as high-speed driving or hill-climbing driving. In such a case, though the heating temperature of the heating resistor 10 rises as the intake air temperature rises in the prior art, the present invention, if applied, can keep the heating temperature low without decreasing the sensitivity even when there is a slight wind.

On a rainy day, there is a possibility that water droplets are attached to the thermal type air flow sensor element 26 via the intake pipe and, especially, in the high air flow area, water droplets tend to be scattered and attached. Although attached water droplets sometimes prevent the air flow from being detected accurately, the present invention, if applied, can increase the heating temperature in the high air flow area and, therefore, can reduce the possibility that water droplets are attached and prevent a decrease in accuracy.

In the slight wind area such as that of an air flow during idling operation, fine materials such as carbon particles tend to collect on the sensor element under the influence of thermal migration and, in the high air flow area, relatively large materials such as spattered mud tend to collect on the sensor element.

Because thermal migration occurs more frequently when the temperature difference is large, the heating temperature of the heating resistor 10 should be as lower as possible to prevent fine particles such as carbon particles from collecting on the sensor element. However, when the heating temperature of the heating resistor 10 is too low, oil vapor tends to collect. Thus, the desirable heating temperature is about 100° C. when there is no wind or the engine is in idling.

On the other hand, because a higher ΔT usually reduces the possibility of soiling in the high air flow area where the wind velocity of 50 m/s, the application of the present invention can prevent soiling.

In the first embodiment of the present invention configured as described above, the introduction of air flow dependency into the heating temperature of the heating resistor 10 improves the sensitivity in the high air flow area, prevents aging deterioration in the resistance value caused by the heat of the heating resistor 10, decreases a measuring error caused by aging deterioration, and prevents an accuracy decrease caused by water droplets attached in wet weather or soilure caused by thermal migration, without complicating the structure of the circuit or the sensor.

Although a part of the temperature sensitive resistor 13 is included in the thin part 7 in the above description, all of the temperature sensitive resistor 13 may also be included in the thin part 7 as required.

Although the temperature sensitive resistor 13 is provided just in the center between the upstream and the downstream in FIG. 3, the present invention is not limited to this configuration. The temperature sensitive resistor 13 may be placed in any position subject to the influence of the heat of the heating resistor.

Next, a second embodiment of the present invention will be described with reference to FIG. 8.

Figure 8:
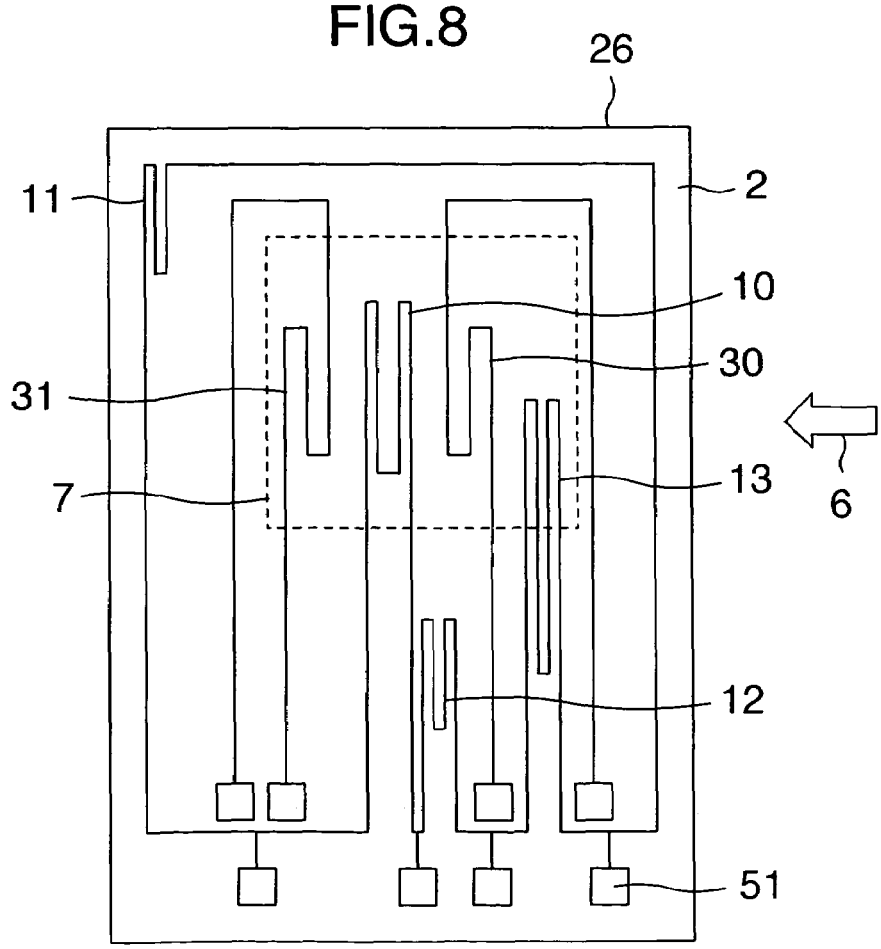
FIG. 8 is a diagram showing the wiring pattern of a thermal type air flow sensor element of a thermal type air flow meter in a second embodiment of the present invention.

FIG. 8 is a diagram showing the wiring pattern of a thermal type air flow sensor element 26 in a thermal type air flow meter 1 in the second embodiment of the present invention.

Referring to FIG. 8, the thermal type air flow sensor element 26 is structured in such a way that a part of a temperature sensitive resistor 13, positioned diagonally to a heating resistor 10 in the bridge circuit shown in FIG. 4, is positioned in the upstream side of a thin part 7 so that it is subject to the influence of the heat of the heating resistor 10. The rest of the structure is the same as that of the first embodiment of the present invention.

The temperature sensitive resistor 13 of the first embodiment of the present invention, shown in FIG. 3, is positioned approximately in the center between the upstream and the downstream in the same way as the heating resistor 10, while the temperature sensitive resistor 13 in the second embodiment of the present invention is positioned in the upstream side of the heating resistor 10 as shown in FIG. 8.

The structure, in which the temperature sensitive resistor 13 is positioned in the upstream side of the heating resistor 10, cools the temperature sensitive resistor 13 in the high air flow more efficiently than in the first embodiment, thus improving the sensitivity in the high air flow.

The second embodiment of the present invention configured as described above also gives the same effect as that of the first embodiment of the present invention.

A third embodiment of the present invention will be described with reference to FIG. 9 and FIG. 10.

Figure 9:
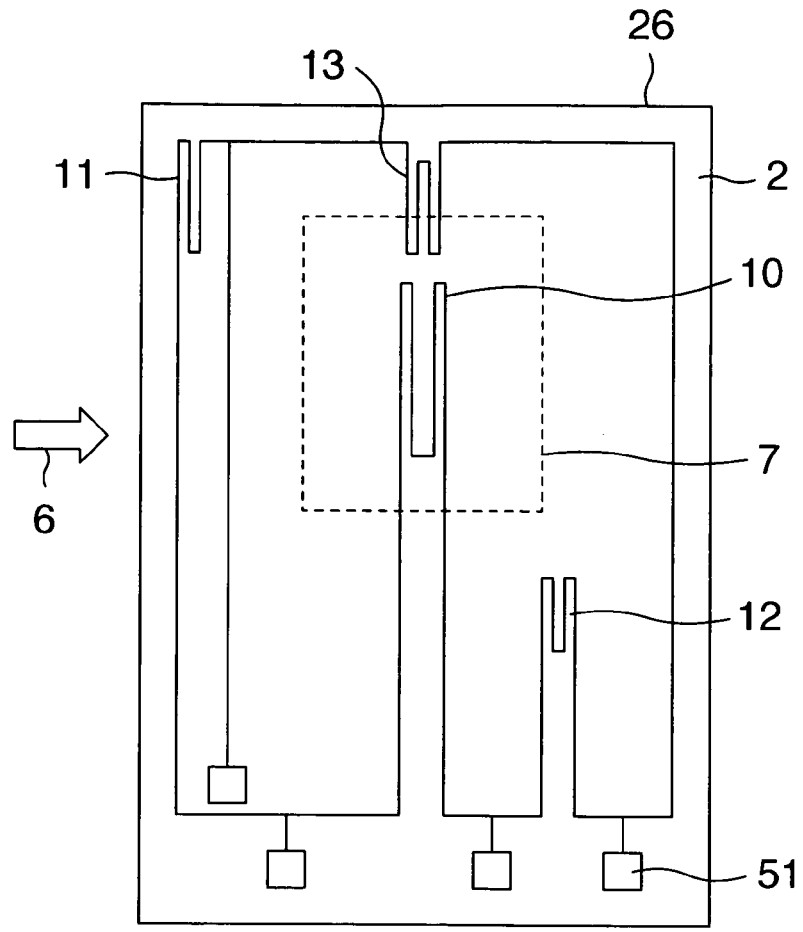
FIG. 9 is a diagram showing the wiring pattern of a thermal type air flow sensor element of a thermal type air flow meter in a third embodiment of the present invention.

FIG. 9 is a diagram showing the wiring pattern of a thermal type air flow sensor element 26 in a thermal type air flow meter 1 in the third embodiment of the present invention.

Referring to FIG. 9, the thermal type air flow sensor element 26 comprises a semiconductor substrate 2, a thin part 7 formed approximately in the center of the semiconductor substrate 2, a heating resistor 10, and temperature sensitive resistors 11, 12, and 13 made of the same material as that of the heating resistor 10. The resistors are connected to an electrode 51, made of aluminum and so on, for electrical connection to an external device. Note that the arrow in FIG. 9 indicates the direction of fluid 6.

The thin part 7 of the semiconductor substrate 2 is formed in a dotted line part shown in FIG. 9 and, in this thin part 7, the heating resistor 10 and a part of the temperature sensitive resistor 13 are provided. The temperature sensitive resistor 13, which is a resistor provided in a position diagonal to the heating resistor 10 in a bridge circuit in FIG. 10 that will be shown later, is placed in a position subject to the influence of the heat of the heating resistor 10. Note that the material of the semiconductor substrate 2 and other elements is the same as that in the first embodiment of the present invention.

Figure 10:
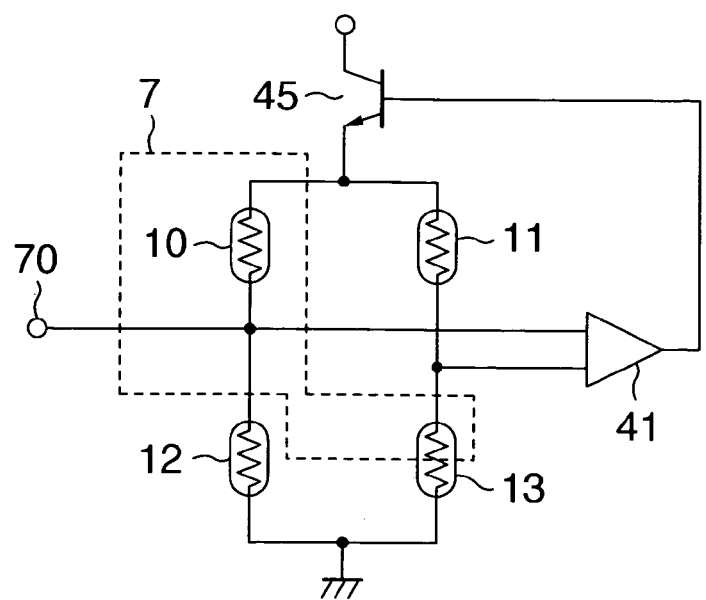
FIG. 10 is a diagram showing a circuit including the thermal type air flow sensor element of the thermal type air flow meter in the third embodiment of the present invention.

FIG. 10 is a diagram showing a circuit including the thermal type air flow sensor element 26 shown in FIG. 9.

Referring to FIG. 10, the circuit including the thermal type air flow sensor element 26 comprises the heating resistor 10, the temperature sensitive resistors 11, 12, and 13, a differential amplifier 41, and a transistor 45. The connection among them is the same as that of the bridge circuit including the heating resistor 10 shown in FIG. 4.

Therefore, the heating temperature of the heating resistor 10 is determined based on the resistance values of the temperature sensitive resistors 11, 12, and 13 and is heat-controlled to an approximately constant temperature difference of $\Delta T$ in relation to the ambient temperature through the feedback control of the differential amplifier 41 and the transistor 45. The connection point between the heating resistor 10 and the temperature sensitive resistor 12 is connected to a terminal 70, the signal of the terminal 70 is used as the output of the thermal type air flow meter 1, and the current consumption of the heating resistor 10 is used as the air flow output.

The third embodiment of the present invention, configured as described above, can also increase the heating temperature of the heating resistor 10 of the thermal type air flow meter 1 as the air flow becomes higher and, therefore, give the same effect as that of the first embodiment of the present invention.

Although a part of the temperature sensitive resistor 13 is included in the thin part 7 in the above description, all of the temperature sensitive resistor 13 may also be included in the thin part 7 as required.

Although the temperature sensitive resistor 13 is provided just in the center between the upstream and the downstream in FIG. 9, the present invention is not limited to this configuration. The temperature sensitive resistor 13 may be placed in any position subject to the influence of the heat of the heating resistor 10.

Next, a fourth embodiment of the present invention will be described with reference to FIG. 11 and FIG. 12.

Figure 11:
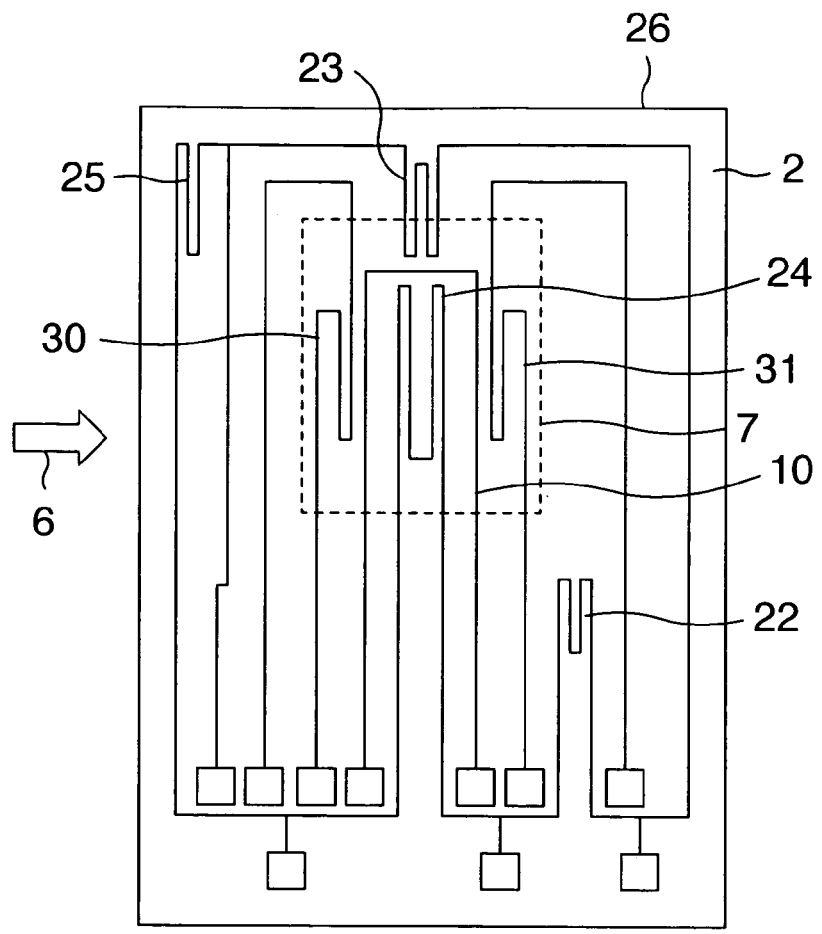
FIG. 11 is a diagram showing the wiring pattern of a thermal type air flow sensor element of a thermal type air flow meter in a fourth embodiment of the present invention.

FIG. 11 is a diagram showing the wiring pattern of a thermal type air flow sensor element 26 in a thermal type air flow meter 1 in the fourth embodiment of the present invention.

Referring to FIG. 11, the thermal type air flow sensor element 26 comprises a semiconductor substrate 2, a thin part 7 formed approximately in the center of the semiconductor substrate 2, a heating resistor 10, temperature sensitive resistors 22, 23, 24, and 25 made of the same material as that of the heating resistor 10, an upstream temperature sensor 30, and a downstream temperature sensor 31. The resistors are connected to an electrode 51, made of aluminum and so on, for electrical connection to an external device. Note that the arrow in FIG. 11 indicates the direction of fluid 6.

The thin part 7 of the semiconductor substrate 2 is formed in the dotted part in FIG. 11 and, in this thin part 7, the heating resistor 10, the temperature sensitive resistor 24, the upstream temperature sensor 30, the downstream temperature sensor 31, and a part of the temperature sensitive resistor 23 are included.

The temperature sensitive resistor 24 is provided near the heating resistor 10, and the temperature change in the temperature sensitive resistor 24 depends on the temperature change in the heating resistor 10. The upstream temperature sensor 30 is provided in the upstream side of the heating resistor 10, while the downstream temperature sensor 31 is provided in the downstream side of the heating resistor 10. The temperature sensitive resistor 24 is provided adjacently to the heating resistor 10, and the temperature sensitive resistor 23, which is a resistor provided in a position diagonal to the temperature sensitive resistor 24 in a bridge circuit that will be shown later in FIG. 12, is placed in a position subject to the influence of the heat of the heating resistor 10. The material of the semiconductor substrate 2 and other elements is the same as that of the first embodiment of the present invention.

Figure 12:
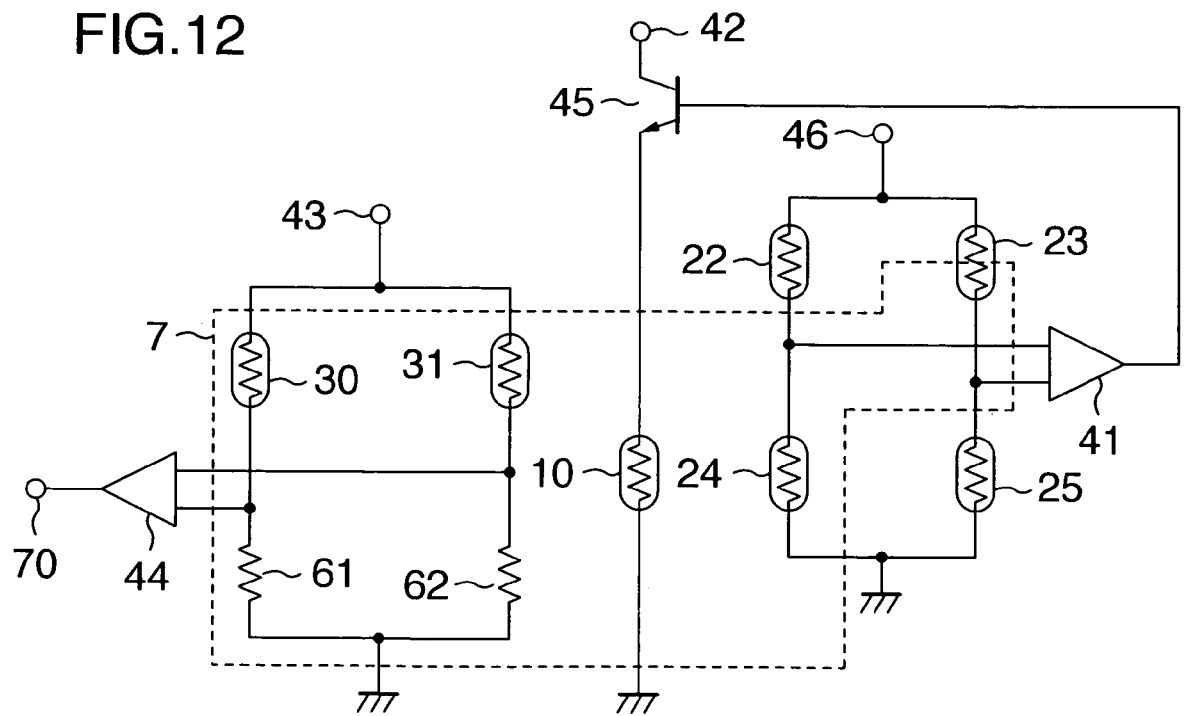
FIG. 12 is a diagram showing a circuit including the thermal type air flow sensor element of the thermal type air flow meter in the fourth embodiment of the present invention.

FIG. 12 is a diagram showing a circuit including the thermal type air flow sensor element 26 shown in FIG. 11.

Referring to FIG. 12, the circuit including the thermal type air flow sensor element 26 comprises the heating resistor 10, the temperature sensitive resistors 22, 23, 24, and 25, differential amplifiers 41 and 44, a transistor 45, the upstream temperature sensor 30, the downstream temperature sensor 31, and fixed resistors 61 and 62.

The temperature sensitive resistors 22, 23, 24, and 25 configure a bridge circuit, in which the temperature sensitive resistors 22 and 24 are connected in series and the temperature sensitive resistors 23 and 25 are connected in series. The series-connected temperature sensitive resistors 22 and 24 are connected in parallel to the series-connected temperature sensitive resistors 23 and 25. The connection point between the temperature sensitive resistors 22 and 24 is connected to one of the terminals of the differential amplifier 41, and the connection point between the temperature sensitive resistors 23 and 25 is connected to the other input terminal of the differential amplifier 41. The output terminal of the differential amplifier 41 is connected to the base of the transistor 45, and the emitter of this transistor 45 is grounded via the heating resistor 10.

The heating temperature of the heating resistor 10 is determined based on the resistance values of the temperature sensitive resistors 22, 23, 24, and 25 and is heat-controlled to an approximately constant temperature difference of ΔT in relation to the ambient temperature.

The upstream and downstream temperature sensors 30 and 31, provided in the upstream and downstream of the heating resistor 10, and the fixed resistors 61 and 62 constitute a temperature sensor bridge circuit. The potential difference corresponding to the temperature difference between the upstream and downstream temperature sensors 30 and 31 is amplified by the differential amplifier 44 and is supplied to the output terminal 70 of the thermal type air flow meter 1.

The fourth embodiment of the present invention, configured as described above, can also increase the heating temperature of the heating resistor 10 of the thermal type air flow meter 1 as the air flow becomes higher and, therefore, give the same effect as that of the first embodiment of the present invention.

Although a part of the temperature sensitive resistor 23 is included in the thin part 7 in the above description, all of the temperature sensitive resistor 23 may also be included in the thin part 7 as required.

Although the temperature sensitive resistor 23 is provided just in the center between the upstream and the downstream in FIG. 11, the present invention is not limited to this configuration. The temperature sensitive resistor 23 may be placed in any position subject to the influence of the heat of the heating resistor 10.

A fifth embodiment of the present invention will be described with reference to FIG. 13 and FIG. 14.

Figure 13:
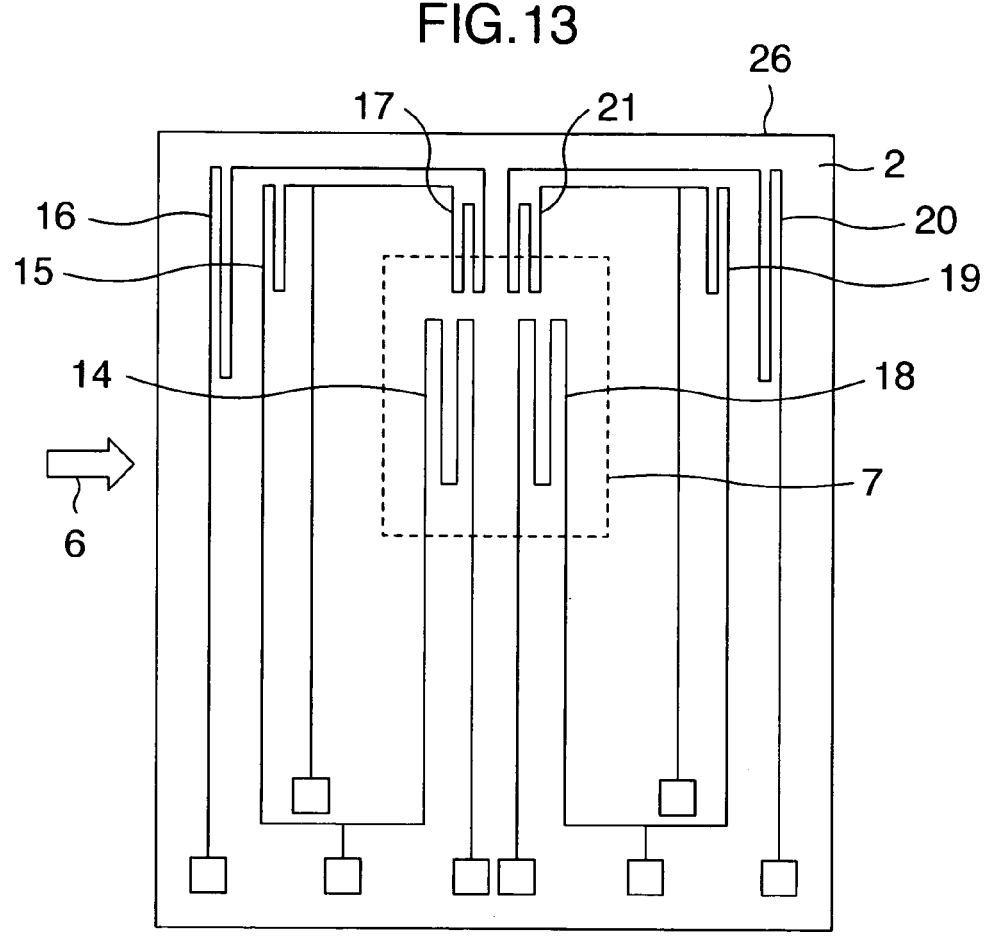
FIG. 13 is a diagram showing the wiring pattern of a thermal type air flow sensor element of a thermal type air flow meter in a fifth embodiment of the present invention.

FIG. 13 is a diagram showing the wiring pattern of a thermal type air flow sensor element 26 in a thermal type air flow meter 1 in the fifth embodiment of the present invention.

Referring to FIG. 13, the thermal type air flow sensor element 26 comprises a semiconductor substrate 2, a thin part 7 formed approximately in the center of the semiconductor substrate 2, heating resistors 14 and 18, and temperature sensitive resistors 15, 16, 17, 19, 20, and 21 made of the same material as that of the heating resistors 14 and 18. The resistors are connected to an electrode 51, made of aluminum and so on, for electrical connection to an external device. Note that the arrow in FIG. 13 indicates the direction of fluid 6.

The thin part 7 of the semiconductor substrate 2 is formed in the dotted part in FIG. 13 and, in this thin part 7, the heating resistors 14 and 18 and a part of each of the temperature sensitive resistors 17 and 21 are included.

The heating resistors 14 and 18 are provided near each other in the upstream and the downstream of the flow of fluid. Three temperature sensitive resistors 15, 16, and 17 are connected to the heating resistor 14 in the upstream side to configure a bridge circuit, and three temperature sensitive resistors 19, 20, and 21 are connected to the heating resistor 18 in the downstream side to configure a bridge circuit. The material of the semiconductor substrate 2 and other elements is the same as that of the first embodiment of the present invention.

Figure 14:
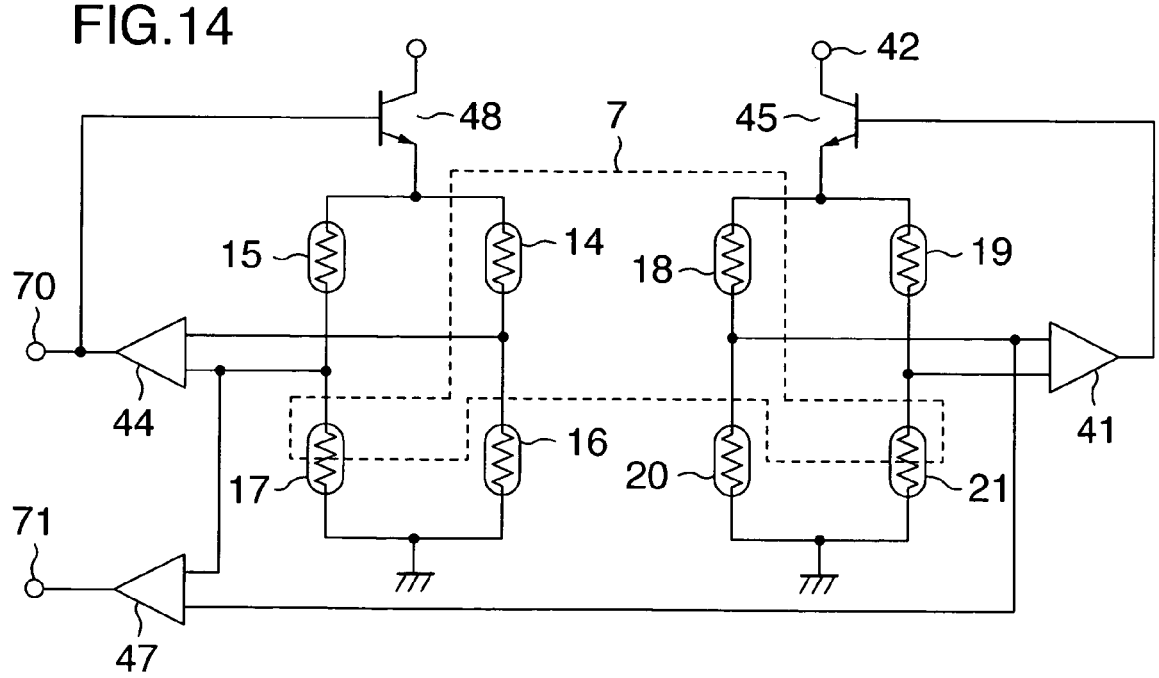
FIG. 14 is a diagram showing a circuit including the thermal type air flow sensor element of the thermal type air flow meter in the fifth embodiment of the present invention.

FIG. 14 is a diagram showing a circuit including the thermal type air flow sensor element 26 shown in FIG. 13.

Referring to FIG. 14, the circuit including the thermal type air flow sensor element 26 comprises the heating resistors 14 and 18, the temperature sensitive resistors 15, 16, 17, 19, 20, and 21, differential amplifiers 41, 44, and 47, and transistors 45 and 48.

The heating resistor 14 and the temperature sensitive resistors 15, 16, and 17 configure a bridge circuit, in which the heating resistor 14 and the temperature sensitive resistor 16 are connected in series and the temperature sensitive resistors 15 and 17 are connected in series. The series-connected heating resistor 14 and the temperature sensitive resistor 16 are connected in parallel to the series-connected temperature sensitive resistors 15 and 17. The connection point between the heating resistor 14 and the temperature sensitive resistor 15 is connected to the emitter of the transistor 48. The connection point between the heating resistor 14 and the temperature sensitive resistor 16 is connected to one of the input terminals of the differential amplifier 44, and the connection point between the temperature sensitive resistors 15 and 17 is connected to the other input terminal of the differential amplifier 44. The output terminal of the differential amplifier 44 is connected to the base of the transistor 48.

The heating temperature of the heating resistor 14 is determined based on the resistance values of the temperature sensitive resistors 15, 16, and 17 and is heat-controlled to an approximately constant temperature difference of ΔT in relation to the ambient temperature through the feedback control of the differential amplifier 41 and the transistor 45.

Similarly, the heating resistor 18 and the temperature sensitive resistors 19, 20, and 21 configure a bridge circuit, in which the heating resistor 18 and the temperature sensitive resistor 20 are connected in series and the temperature sensitive resistors 19 and 21 are connected in series. The series-connected heating resistor 18 and the temperature sensitive resistor 20 are connected in parallel to the series-connected temperature sensitive resistors 19 and 21. The connection point between the heating resistor 18 and the temperature sensitive resistor 19 is connected to the emitter of the transistor 45. The connection point between the heating resistor 18 and the temperature sensitive resistor 20 is connected to one of the input terminals of the differential amplifier 41, and the connection point between the temperature sensitive resistors 19 and 21 is connected to the other input terminal of the differential amplifier 41. The output terminal of the differential amplifier 41 is connected to the base of the transistor 45.

The heating temperature of the heating resistor 18 is determined based on the resistance values of the temperature sensitive resistors 19, 20, and 21 and is heat-controlled to an approximately constant temperature difference of ΔT in relation to the ambient temperature through the feedback control of the differential amplifier 44 and the transistor 48.

The connection point between the temperature sensitive resistors 15 and 17 is connected to one of the input terminals of a differential amplifier 47, and the connection point between the heating resistor 18 and the temperature sensitive resistor 20 is connected to the other input terminal of the differential amplifier 47. The output signal of the differential amplifier 47 is supplied to an output terminal 71 and the output signal of the output terminal 71 is used as a signal indicating the flow direction of fluid.

It is desirable that the temperature sensitive resistor 17 in the upstream side and the temperature sensitive resistor 21 in the downstream side be placed as near as possible to minimize the temperature difference between them and to minimize the temperature difference between the heating resistor 14 in the upstream side and the heating resistor 18 in the downstream side.

The fifth embodiment of the present invention, configured as described above, can also increase the heating temperature of the heating resistors 14 and 18 of the thermal type air flow meter 1 as the air flow becomes higher and, therefore, give the same effect as that of the first embodiment of the present invention.

Although a part of the temperature sensitive resistors 17 and 21 is included in the thin part 7 in the above description, all of the temperature sensitive resistors 17 and 21 may also be included in the thin part 7 as required.

The present invention is applicable not to the control system of the gasoline engine shown in FIG. 1 but also to that of a diesel engine that has basically the same configuration. The present invention is also applicable to an air flow sensor for detecting the air flow of EGR (Exhaust Gas Recirculation) gas of an internal combustion engine.

Not only the flow of air but also the flow of other type of fluid can also be measured. For example, the present invention can also be applied to measure the flow of hydrogen gas used for a fuel cell. The present invention can also be applied to measure the flow of propane gas.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A thermal type flow measuring apparatus for measuring a flow of fluid, comprising:
   a substrate on which a thin part is formed;
   a heating resistor provided in said thin part; and
   a bridge circuit including a plurality of temperature sensitive resistors constituting the bridge circuit; and
   a feedback circuit which controls a temperature of said heating resistor by controlling a current flowing through said heating resistor to cause the bridge circuit to be balanced;
   wherein a part or whole of at least one of the temperature sensitive resistors is placed in said thin part so that conductive heat transferred to said at least one of the temperature sensitive resistors from said heating resistor is varied depending on the flow of fluid, and the temperature of the heating resistor controlled by said feedback circuit is increased as the flow of the fluid is increased due to change of balance of said bridge circuit.

2. A thermal type flow measuring apparatus, comprising:
   a substrate on which a thin part is formed;
   a heating resistor provided in said thin part;
   an upstream temperature sensor element provided in said thin part and in an upstream side of a flow direction of fluid with respect to a position of said heating resistor; and
   a downstream temperature sensor element provided in said thin part and in a downstream side of the flow direction of fluid with respect to the position of said heating resistor,
   wherein a bridge circuit, which has a plurality of temperature sensitive resistor elements and has said heating resistor on one of sides thereof, is formed to drive said heating resistor to have a constant temperature difference from an ambient temperature, a part or whole of the temperature sensitive resistor element placed in a position diagonal to the heating resistor of said bridge circuit is provided in said thin part, and a flow of the fluid is measured based on a difference between a temperature detected by said upstream temperature sensor element and a temperature detected by said downstream temperature sensor element.

3. The thermal type flow measuring apparatus according to claim 2,
   wherein the part or whole of said temperature sensitive resistor element positioned diagonally to the heating resistor is placed in a center area of said thin part with respect to the flow direction of the fluid in said thin part.

4. The thermal type flow measuring apparatus according to claim 2,
   wherein the part or whole of said temperature sensitive resistor element positioned diagonally to the heating resistor is placed in an upstream side of said heating resistor with respect to the flow direction of the fluid in said thin part.

5. The thermal type flow measuring apparatus according to claim 2,
   wherein said heating resistor and said plurality of temperature sensitive resistor elements forming the bridge circuit are made of the same temperature sensitive resistive material.

6. The thermal type flow measuring apparatus according to claim 1, wherein said heating resistor is arranged at one arm of said bridge circuit, and said at least one of the temperature sensitive resistors is arranged at another arm of said bridge circuit diagonally opposite to the arm of said heating resistor.

7. The thermal type flow measuring apparatus according to claim 1, wherein said beating resistor is provided separately from said bridge circuit, and
   another one of the temperature sensitive resistors arranged at an arm of said bridge circuit diagonally opposite to the arm of said at least one of the temperature sensitive resistors is arranged near said heating resistor on said thin part so that temperature change in said another one of the temperature sensitive resistors depends on the temperature change in said heating resistor.

8. A thermal type flow measuring apparatus, comprising:
   a substrate on which a thin part is formed;
   a heating resistor provided in said thin part;
   an upstream temperature sensor element provided in said thin part and in an upstream side of a flow direction of fluid with respect to a position of said heating resistor; and
   a downstream temperature sensor element provided in said thin part in a downstream side of the flow direction of fluid with respect to the position of said heating resistor,
   wherein a bridge circuit, which has a plurality of temperature sensitive resistor elements, is formed to drive said heating resistor to have a constant temperature difference from an ambient temperature.

one temperature sensitive resistor element of the bridge circuit is placed in said thin part and near the heating resistor and a part or whole of the temperature sensitive resistor element placed in a position in the bridge circuit diagonal to the temperature sensitive resistor element placed near the heating resistor is provided in said thin part, and a flow of the fluid is measured based on a temperature difference detected by said upstream temperature sensor element and said downstream temperature sensor element.

9. The thermal type flow measuring apparatus according to claim 8,
wherein the part or whole of said temperature sensitive resistor element positioned diagonally to the temperature sensitive resistor element placed near said heating resistor is placed in a center area of said thin part with respect to the flow direction of the fluid in said thin part.

10. The thermal type flow measuring apparatus according to claim 8,
wherein the part or whole of said temperature sensitive resistor element positioned diagonally to the temperature sensitive resistor element placed near said heating resistor is placed in an upstream side of said heating resistor with respect to the flow direction of the fluid in said thin part.

11. The thermal type flow measuring apparatus according to claim 8,
wherein said heating resistor and said plurality of temperature sensitive resistor elements forming the bridge circuit are made of the same temperature sensitive resistive material.

12. A thermal type flow measuring apparatus, comprising:
a substrate on which a thin part is formed; a first heating resistor provided in said thin part;
a second heating resistor provided in said thin part and in a downstream side of a flow direction of fluid with respect to a position of said first heating resistor;
a first bridge circuit, which has a plurality of temperature sensitive resistor elements and has said first heating resistor on one of sides thereof, to drive said first heating resistor to have a constant temperature difference from an ambient temperature; and
a second bridge circuit, which has a plurality of temperature sensitive resistor elements and has said second heating resistor on one of sides thereof, to drive said second heating resistor to have a constant temperature difference from an ambient temperature,
wherein a part or whole of the temperature sensitive resistor element, which is in a position diagonal to the first heating resistor in the first bridge circuit, is provided in said thin part,
a part or whole of the temperature sensitive resistor element, which is in a position diagonal to the second heating resistor in the second bridge circuit, is provided in said thin part, and
a flow measuring signal of the fluid is generated based on the first bridge circuit and a fluid flow direction signal is generated based on the first bridge circuit and the second bridge circuit.

13. The thermal type flow measuring apparatus according to claim 12,
wherein the parts or wholes of the two temperature sensitive resistor elements positioned diagonally to the first and second heating resistors are placed in a center area of said thin part with respect to the flow direction of the fluid in said thin part.

14. The thermal type flow measuring apparatus according to claim 12,
wherein the parts or wholes of the two temperature sensitive resistor elements positioned diagonally to the first and second heating resistors are placed in an upstream side of said heating resistors with respect to the flow direction of the fluid in said thin part.

15. The thermal type flow measuring apparatus according to claim 12,
wherein said first and second heating resistors and said plurality of temperature sensitive resistor elements forming the first and second bridge circuits are made of the same temperature sensitive resistive material.

16. An internal combustion engine control system comprising flow measuring means for measuring an air flow to be supplied to an internal combustion engine and means for controlling the air flow based on the flow measured by the flow measuring means,
said flow measuring means comprising:
a substrate on which a thin part is formed;
a heating resistor provided in said thin part; and
a bridge circuit including a plurality of temperature sensitive resistors constituting the bridge circuit; and
a feedback circuit which controls a temperature of said heating resistor by controlling a current flowing through said heating resistor to cause the bridge circuit to be balanced,
wherein a part or whole of one of resistor elements forming the bridge circuit is placed in said thin part so that conductive heat transferred to said at least one of the temperature sensitive resistors from said heating resistor is varied depending on the flow of fluid, and the temperature of the heating resistor controlled by said feedback circuit is increased as the flow of the fluid is increased due to change of balance of said bridge circuit.

* * * * *